H. BESSER.
CEMENT PIPE MAKING MACHINE
APPLICATION FILED JUNE 7, 1907.

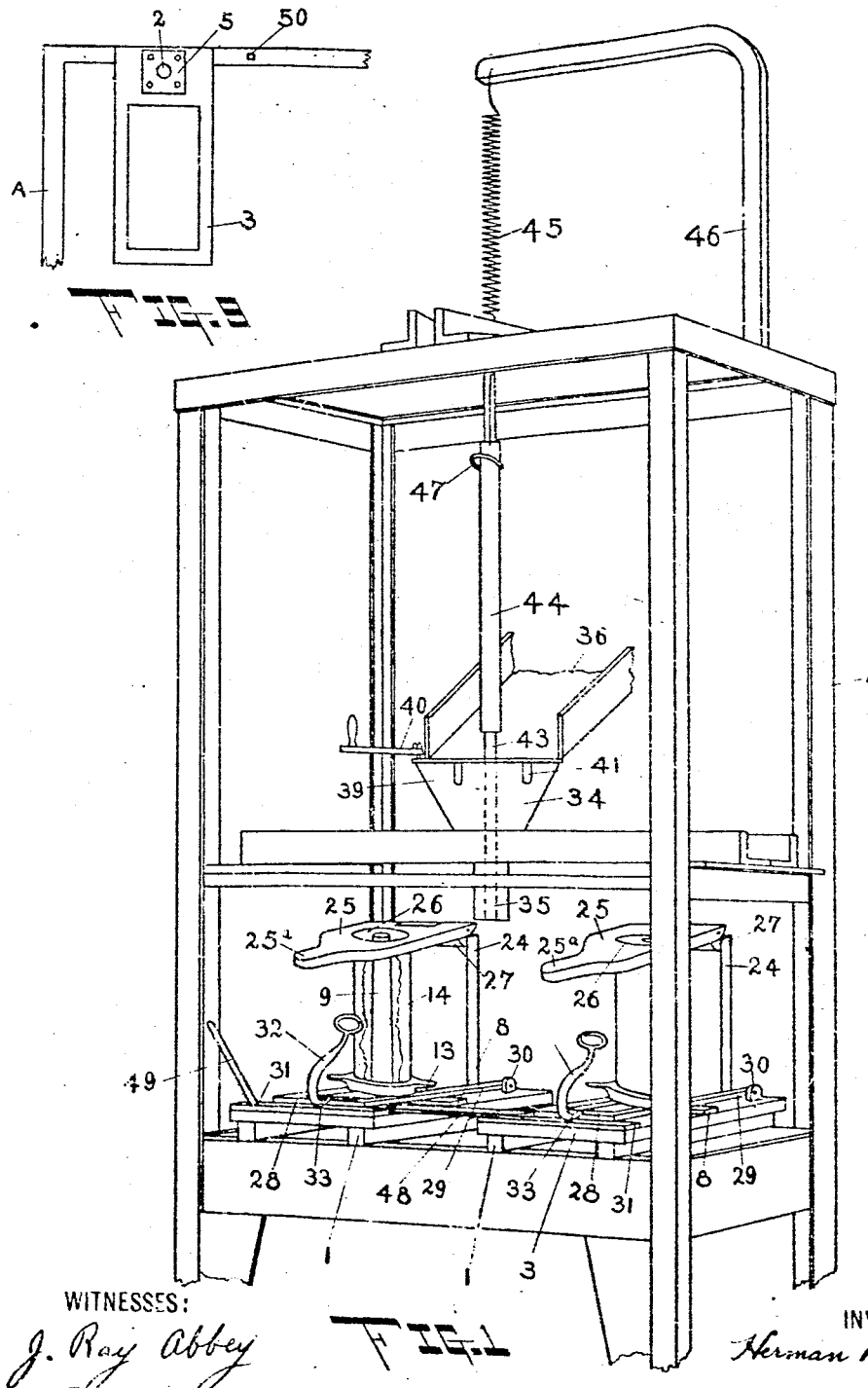

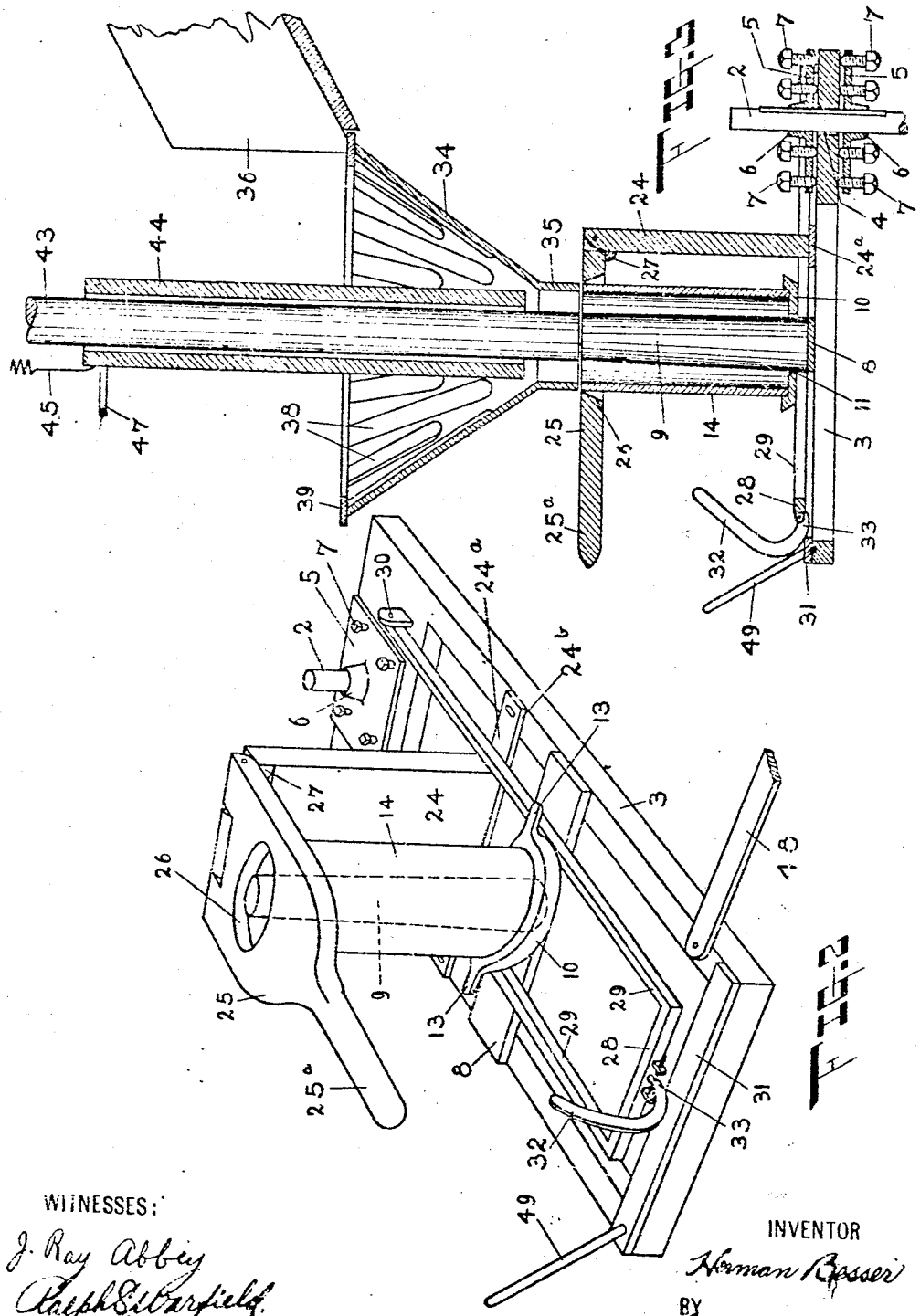

898,428.

Patented Sept. 15, 1908.

3 SHEETS—SHEET 3.

WITNESSES:
J. Ray Abbey
Ralph S. Warfield

INVENTOR
Herman Besser.
BY
Geo. R. Willcox
ATTORNEY

UNITED STATES PATENT OFFICE.

HERMAN BESSER, OF ALPENA, MICHIGAN.

CEMENT-PIPE-MAKING MACHINE.

No. 898,428.　　　　Specification of Letters Patent.　　　Patented Sept. 15, 1908.

Application filed June 7, 1907. Serial No. 377,776.

*To all whom it may concern:*

Be it known that I, HERMAN BESSER, a citizen of the United States, residing at Alpena, in the county of Alpena and State of Michigan, have invented certain new and useful Improvements in Cement-Pipe-Making Machines; and I do hereby declare the following to be a full, clear, and exact description of the invention, such as will enable others skilled in the art to which it appertains to make and use the same.

My invention relates to pipe or tile making machines adapted to manufacture drain tile or pipe of any cementitious material much more rapidly and economically than heretofore.

Another object is to provide a machine which can be operated practically continuously.

A further object is to provide a novel feeding and tamping means combined.

A still further object is to provide a novel mold wherein the article molded may be removed from the machine and subsequently freed from the mold.

Still another object is the provision of a mold which will not injure the molded article when it is being released.

Another object is the provision of means for starting the mold and the therein contained article from the core.

A further object is the provision of means for agitating the material as it is fed to the mold.

Still another object is the provision of means for releasably retaining the mold in position in the machine.

A further object consists in the provision of a machine whereby one tamper will coöperate with a plurality of molds adapted to be alternately swung into position relative to the tamper.

Another object is the provision of a mold of such shape that the article is uninjured during its release from the mold.

Another object is the provision of a combined mold and carrier.

Another object is the provision of a novel lock and release for the mold.

Still another object is the provision of adjusting means for maintaining the swinging mold tables in horizontal position.

Another object is the provision of means for automatically centering the mold relative to the core.

Another object attained is the practically automatic stroking off of the molded article prior to its removal from the machine.

My invention further consists in many other novel features and combinations, such as will be more fully described hereinafter and particularly pointed out in the claims.

Figures 4, 5:
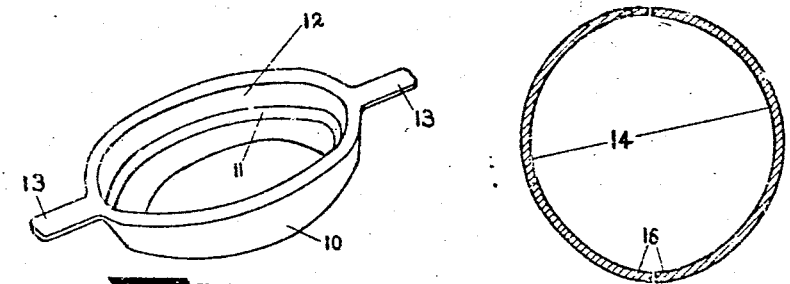
Figures 6, 7:
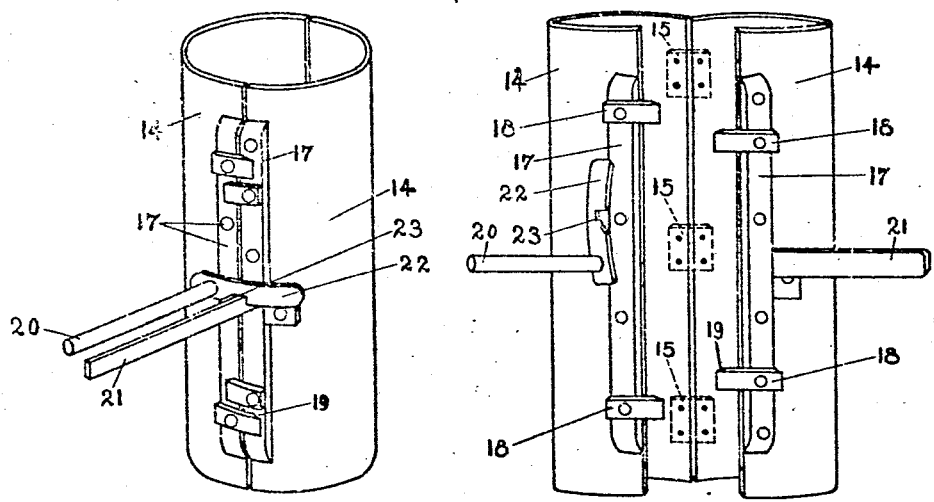
Figure 8:
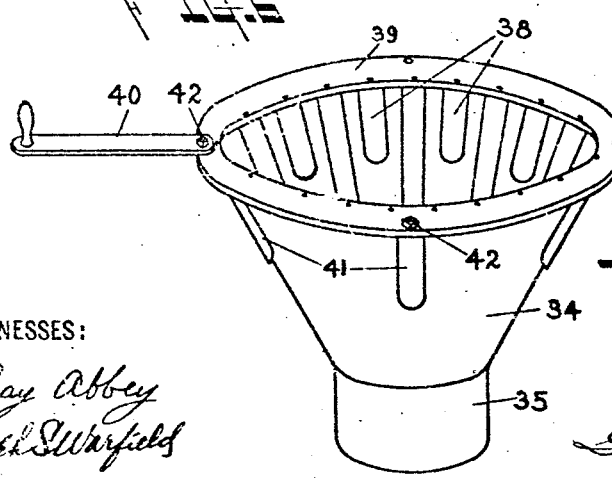

In the accompanying drawings, Figure 1 is a perspective view of a machine embodying one form of my invention; Fig. 2 is an enlarged perspective view of the molding apparatus; Fig. 3 is a vertical sectional view of the same; Fig. 4 is a perspective detail view of the circular base ring or pallet; Fig. 5 is a cross sectional view through the mold showing its oval shape; Fig. 6 is a detail perspective view of the mold when closed; Fig. 7 is a detail perspective view of the mold when open; Fig. 8 is a detail perspective view showing the agitator and hopper; and Fig. 9 is a top plan view showing a stop for limiting the movement of a swinging table.

(A) indicates the frame of the machine which may be of any convenient size depending upon the number of molds operated. I have shown the frame arranged to accommodate two swinging mold-supporting tables, but it is obvious that the invention will operate successfully with one table only or with more than two, and while I have shown but one hopper for two tables, it is plain that the tables might be so arranged to coöperate with individual hoppers or one hopper could supply more than two molds.

Furthermore, though I have shown the invention equipped for manufacturing round straight tile, it is obvious that square molds might be substituted for the round molds and that the molds might be arranged to manufacture tile adapted to be joined, as well.

The frame is provided with a stationary table (1) of any convenient construction to support the mold apparatus. In the present instance, I have shown a skeleton table formed of bars on which the swinging tables or plates rest, such skeleton table preventing the surplus material from accumulating thereon.

Located at the rear of the frame (see Figs. 2 and 3) and suitably secured thereto in any manner (not shown) are one or more shafts (2) (2) to which are secured the swinging tables (3) (3). It is obvious that the shafts may be arranged to be stationary and the table rotate relative thereto, but I prefer to have the shaft rotate with the swinging table, the shaft passing through an aperture (4)

formed in the rear end of the swinging table. Located beneath and above the table at its point of connection with the shaft are the adjustable plates (5) (5) having bearings (6) (6) adjustably secured to the shaft and provided with set screws (7) (7) engaging the top and bottom of the table (3) to retain it adjustably in horizontal position.

The swinging tables are preferably rectangular in shape and of skeleton formation to permit any surplus material to fall to the ground. Secured to any suitable support as the bar (8) located intermediate the ends of the table is a stationary core (9) slightly tapering, as shown from its base to its free upper end, the taper being exaggerated in the drawings. An annular base (10) is removably received on the core and is supported on the arms (29) (29) of a stationary yoke, such base being provided with a shoulder (11) for receiving and sustaining the lower end of a hollow mold or casing, the wall (12) of the inner periphery of the base ring being slightly conical. The width of the shoulder determines the thickness of the tile or pipe and the inclined or frusto-conical periphery assists in centering the mold relative to the ring. The base ring is also provided with handles or lugs (13) (13) extending outward diametrically from each other from the upper edge of the ring, whereby a space is left between the handles and the bar (8) to permit the operator to place or lift off the ring.

The mold comprises preferably two approximately semi-tubular sections (14) (14) joined to each other by hinges as at (15) (15). The opposite longitudinal edges of the mold are bent outward very slightly as at (16) (16) tending toward giving the mold a slight oval shape, the object of which is to permit the mold to open away from the article whereby the latter is constantly released without liability of cracking, breaking or otherwise injuring the tender concrete.

Each of the half sections (14) (14) is provided along its free edge with a rib (17), the ribs each carrying a pair of lugs (18) preferably beveled at one end, as at (19), the lugs of one rib projecting over the opposite rib to prevent lateral movement of the free edges of either of the sections either inwardly or outwardly. Furthermore, the lugs serve as guides to bring the free ends of the sections into abutting contact.

Projecting laterally outward from the free edge of each section are handles (20) and (21), handle (20) being substantially rigid and having a latch (22) pivoted at one end thereto while handle (21) is resilient and is preferably formed of a flat piece of metal. The latch is provided with a wide notch (23) intermediate its length adapted to drop over and receive the resilient handle (21), whereby to hold the mold in closed position. To open the mold and release it from the article, the two handles are grasped in one hand, pressure being applied to spring the resilient handle toward the rigid handle, such movement being permitted by the width of the notch (23) of the latch, after which the free end of the latch is raised, the latch being easily removed, whereupon the two handles are gently separated to open the mold, the free edges of the mold clearing the article and as the mold is opened it is pushed slightly in such manner as to cause its hinged edge to move away from the article. The mold, when clear of the article may be lifted off. I have found in practice that this operation consumes but little time and is necessary in view of the fact that the material has been packed most compactly in the mold and is very tender, so much so in fact that if the latch is sprung off the resilient handle the mold will quickly spring apart jarring and invariably cracking, breaking or otherwise injuring the article. Of course, if the material were allowed to set in the mold such precaution as above set forth would be unnecessary, but the mold is removed from the machine immediately after being filled and is released from the article and replaced in the machine.

I am aware that many molds are provided with locks moving past a dead center and adapted to be suddenly released, but such molds are most liable to injure the article by reason of such quick release of pressure.

Such a mold as I have shown and described is placed over and surrounding the rigid core, the lower end of the mold being supported on the shoulder (11) of the base ring.

Located rearwardly of the stationary core is a bracket (24) secured to the swinging table (3), and to the upper end, preferably, of the bracket is hinged a centering plate (25) having a handle (25ª), the plate provided with a frusto-conical aperture (26) within which the upper end of the mold is received and by which it is centered relative to the core (9), the aperture and the core being coaxial. The weight of the plate (25) is such as to normally retain the mold in upright position and with the base ring (10) prevents lateral movement of the mold, a stop (27) being carried by the bracket and engaged by the plate to retain the latter in horizontal position when in its lowered position.

It will be understood that not only will the compacted material in the mold create an expanding pressure thereon, but also that there will be considerable friction between the material and the core, which friction must be gently overcome as a sudden jerk upward on the handles (13) of the base ring tends to injure the molded article, wherefore, I preferably provide a release comprising a yoke (28), the arms (29) of which extend rearwardly from a point near the forward end of the swinging table and are pivotally secured to the table, as at (30) (30), the arms passing beneath the base ring and resting upon the bar (8). A fulcrum bar (31) is secured near the forward end of the swinging table, a curved lever (32) having its convex portion resting on the bar, the shorter arm (33) of the lever being pivotally connected to the yoke (28), the longer free arm of the lever projecting upwardly. When it is desired to release the mold and its therein-contained articles from the core, the operator swings the free end of the lever downwardly whereby the yoke is inclined on its pivots (30) and raises the base ring (10), the mold and the article, retaining them in such position until they are removed, after which the lever (32) is drawn back to its original position. The cross-sectional area of the opening in the ring is such that when the ring is in position on the arms (29) of the yoke, it snugly fits the core (9) without being tight thereon.

The filling and tamping mechanism is as follows. Supported in a plane above the mold is a hopper (34), the neck (35) of which depends to a point almost but not quite in contact with the upper surface of the centering plate (25) so that the latter just clears the lower end of the hopper in its movement. The neck of the hopper may be of a diameter approximately equal to the diameter of the upper end of the centering aperture (26) in the plate (25), the upper end of the core (9) projecting into and being on a plane with the upper surface of the plate (25). A chute (36) leads the material to the hopper and an agitator on the hopper operates to prevent the material from clogging and feeds it down the neck. This agitator comprises in effect a skeleton hopper consisting of, it may be, alternating long and short teeth (38) operating adjacent and parallel with the funnel-shaped wall of the hopper, the upper ends of the teeth being secured to a ring (39) resting upon the upper edge of the hopper, a handle (40) being provided whereby to oscillate the agitator relative to the hopper. In order to prevent the disengagement of the agitator from the hopper, I provide a plurality of fingers (41) secured to the ring and depending parallel with and outside the hopper, one or two fingers being removably secured to the ring as by the nuts (42) to permit the placing and removal of the agitator.

The tamper is as follows. Depending from the upper end of the frame is a stationary guide rod (43) which enters the hopper and terminates preferably even with the lower end of the neck, the guide rod being in alinement with and of approximately the same diameter as the upper end of the core (9). Surrounding this guide rod is a tube (44) loosely slidable thereon and suspended by a spring (45) of sufficient tension, the spring being carried by an arm (46) on the frame. This tube constitutes the tamper and is provided with a handle (47) for operating it.

The general operation of my device is as follows. Assuming the parts are in the position shown in Fig. 1, the swinging table is moved beneath the neck (35) of the hopper and material fed to the hopper by the chute. The operator grasps the handle (40) of the agitator with one hand and the handle (47) of the tamper with the other hand, oscillating the agitator and reciprocating the tamper. As the material flows into the hopper the agitator distributes it evenly around the guide rod (43) and the tamper forces it down into the mold, this operation continuing until the mold and the neck or a portion thereof are solidly packed with the material whereupon the table (3) is swung from beneath the hopper and the plate (25) thrown upwardly to release the mold, after which the lever (32) is operated to start and raise the mold as hereinbefore described. Thereupon the handles (13) (13) are grasped and the mold and its contents lifted off the core. The handles (20) (21) may then be taken hold of to lift the mold and its contents off the base ring, the latter being replaced on the core. The mold is then carried to a suitable place, the article within being protected thereby until a suitable support is found, the mold being placed on end on the support and released from the article in the manner hereinbefore set forth, after which the mold may be closed and returned to the machine for further use, the tile or pipe being left to set and harden before being carried to the seasoning room.

The object of packing the neck of the hopper with the material is to permit of a nice clean stroke-off as the swinging table is moved from beneath the closely adjacent neck and also such packed material serves as a plug to prevent the loose material in the hopper from discharging when there is no mold beneath. As soon as one mold is removed an empty mold is substituted therefor, and the packed material in the neck of the hopper is forced to the bottom thereof to form one end of the succeeding tile.

In order to afford an exact adjustment for the centering plate (25) the bracket support (24ᵃ) is slotted, set screws (24ᵇ) securing the support to the swinging table, and in order to easily and quickly center the mold relative to the hopper, I provide a stop (50) against which the swinging table strikes when in position beneath the hopper. The stop may be adjustable.

It is obvious that the machine will operate successfully with but a single table, but the output can be more than doubled by effecting the arrangement shown in Fig. 1, wherein I provide two swing tables connected by a link (48) pivotally secured to the tables. A handle (49) is secured to one of the tables by means of which the tables are alternately swung under and away from the hopper. In this manner, the operator handling the agitator and tamper can keep constantly busy since as one mold is swung from beneath the hopper, the opposite mold is by the same action brought under the hopper.

The invention is capable of use in making other articles than drain tile or piping either round or rectangular, by simply changing the shape of the tamper hopper, mold centerer, and base ring.

I can vary the sizes of the tiles or pipes without changing the starting mechanism. It will also be observed that by running the arms of the yoke on opposite sides of the mold, the latter is raised evenly without danger of injury to the contents, a very strong leverage at the expense of slight exertion being obtained through the short arm of the curved lever.

It is evident that many changes might be made in the form and arrangement of the several parts described without departing from the spirit and scope of my invention, and hence I do not wish to limit myself to the exact construction herein set forth.

Having thus fully disclosed my invention, what I claim as new is—

1. A tile machine comprising a hopper, a reciprocatory tamper suspended above the hopper and moving up and down through the hopper at each stroke, a stationary depending guide surrounded by the tamper, a table capable of movement beneath and away from the hopper, a core carried by and stationary with the table and independent of the guide, and a mold mounted on the table, the mold surrounding the core and removable relative thereto and to the table.

2. A molding machine comprising a suitable support, a reciprocatory tamper suspended above the support, a pair of tables pivotally supported independently of each other, the tables lying parallel with each other, means extending between and pivotally connected to the respective tables, whereby the tables are capable of a parallel movement on the support relative to the tamper, and a core and mold coöperating with each table.

3. A molding machine comprising a stationary hopper, a neck depending from the hopper, a guide received centrally in the hopper and neck, the lower ends of the guide and of the neck terminating in substantially the same plane, a horizontally movable mold support beneath the hopper, a mold carried by and movable with the support, the upper end of the mold lying in alinement with and closely adjacent to the lower end of the neck, a reciprocatory tamper encircling the guide, and a core associated with the mold, and separate from the guide, the upper end of the core lying adjacent to and in alinement with the guide, the neck capable of having a plug of tamped material formed therein above the mold, the plug closing the neck to the loose material in the hopper.

4. A molding machine comprising a hopper, a reciprocatory tamper suspended above the hopper, the lower end of the tamper passing through the hopper at each stroke, a guide for the tamper, a mold support movably located beneath the hopper, a mold carried by and moving with the support, a core associated with the table, and separate from the guide, the upper end of the core lying adjacent to and in alinement with the guide.

5. The combination in a tile-machine, of a stationary hopper, a reciprocating tamper, a table horizontally movable relative to the hopper, a core associated with the table, a mold releasably mounted on the table and adapted to be moved beneath and away from the hopper, and a vertically movable plate carried by the table, the plate provided with an aperture having a beveled wall, the plate located between the upper end of the mold and the lower end of the hopper when the mold is to be filled, the upper end of the mold receivable in and centered by the aperture in the plate when the latter is in its horizontal position.

6. A molding machine comprising a movable table, a hopper relative to which the table is movable, mold apparatus removably supported on the table, a core inclosed by the mold and starting mechanism carried by the table for loosening the mold relative to the core, the starting mechanism engaging the lower end of the mold apparatus.

7. A molding machine comprising a movable table, a stationary hopper relative to which the table moves, a core stationarily mounted on the table, mold apparatus inclosing the core, and starting mechanism carried by the table and over which the mold apparatus extends for loosening the latter and its contents relative to the core.

8. A molding machine comprising a stationary depending guide, a hopper, a mold support movable relative to the guide and hopper, a mold carried by and moving with the support, a tamper associated with the guide and normally suspended above the hopper, the lower end of the tamper passing into the hopper at each stroke, and a core associated with the mold and adapted to be brought into alinement with the lower end of the guide, the core being independent of the guide.

9. The combination with a mold, and a core, of a depending stationary guide-rod independent of and in alinement with the core, a tubular tamper encircling the guide-rod and reciprocating relative to the mold, a spring member attached to the tamper and normally sustaining the lower end of the tamper in a plane above the mold, the lower end of the tamper passing into and out of the mold at each stroke.

10. The combination with a mold, of a hopper, a ring carried by the hopper, fingers secured to the ring and depending within the hopper, means for retaining the ring on the hopper and means for moving the ring relative to the hopper.

11. The combination with a stationary hopper and a mold removably located beneath the hopper, of a neck carried by the hopper, the neck being of substantially the same cross-sectional area as is the mold, the lower end of the neck lying closely adjacent the upper end of the mold and capable of being partially filled with compacted material and a movable support on which the mold is carried, the mold capable of movement in a horizontal plane beneath and away from the neck of the hopper.

12. A molding machine comprising a removable mold, a core encircled by the mold, a stationary hopper, a stationary guide rod depending into the hopper the guide-rod being independent of and in alinement with the core, the lower end of the guide rod and the upper end of the core lying closely adjacent each other and a tamper movable on the rod and adapted to pass through the hopper into the mold.

13. A molding machine comprising a stationary hopper, a suitable tamping mechanism, a horizontally movable support, a core associated with the support, an apertured base ring received on the core, the base-ring provided with an annular beveled centering shoulder, a mold, the lower edge of which is removably seated on the base ring within the centering shoulder, and an apertured centering plate for receiving the upper end of the mold, the aperture in which plate is beveled.

14. A molding machine comprising a single stationary hopper, a pair of swinging tables, a link connecting the tables, and a mold removably mounted on each table, the respective molds adapted to be alternately moved beneath and away from the hopper with their respective tables.

15. A molding machine comprising a pair of tables arranged approximately parallel with each other, a single stationary hopper, a mold removably supported on each table, a link pivotally connecting the tables near their free ends, the tables adapted to be simultaneously actuated to alternately bring the respective molds beneath the hopper.

16. A molding machine comprising a filling mechanism, a table, a shaft to which the table is connected, bearing plates on the shaft, set screws carried by the plates and engaging the table to afford an adjustment therefor, and a mold removably supported by the table, the table and its mold adapted to be swung beneath and away from the filling mechanism.

17. A molding machine comprising a stationary depending guide, a tamper associated with the guide, a spring connected to the tamper for suspending the same, a handle on the tamper for moving the latter relative to the guide alternately with and against the tension of the spring, a movable support, a mold carried by and moving with the support, a core associated with the mold, the core being independent of the guide.

18. A molding machine comprising a stationary depending guide, a tamper associated with the guide, a table movable relative to the guide and tamper mold carried by and moving with the table, and a core stationary with the table, the core adapted to be brought into substantial alinement with the guide and being independent of the guide.

19. A molding machine comprising a suitable support, a core secured to the support, a base ring encircling the core, a mold, the lower end of which rests on the base ring, and a starting mechanism pivoted to the support and received beneath the base ring to start the mold and its contents relative to the stationary core.

20. A molding machine comprising a suitable support, a core secured thereto, a pallet member received on the core, a mold resting on the pallet member, and a lever pivotally attached to the support and having arms passing beneath opposite sides of the pallet member for raising the latter, the mold and its contents relative to the stationary core.

21. A molding machine comprising a core, a mold removably encircling the core, a yoke, the arms of which extend on opposite sides of the mold, the free ends of the arms being pivoted, a fulcrum bar, and a curved lever, the curved portion of which slidingly engages the fulcrum bar, one end of the lever being pivotally secured to the yoke.

22. A molding machine comprising a core, a mold removably encircling the core, a base ring on which the mold is seated, handles projecting from the base ring, a yoke, the arms of which take beneath the base ring and extend rearwardly of the mold, a fulcrum bar, and a curved lever engaging the fulcrum bar, one end of the lever being pivotally secured to the yoke.

23. A mold comprising a split body portion, a substantially rigid handle projecting laterally from the mold on one side of the split, a resilient handle projecting from the mold on the opposite side of the split, and a notched latch located on one side of the split and adapted to take over the resilient handle on the opposite side.

24. A mold comprising a split body portion, a substantially rigid handle located on one side of the split, a resilient handle located on the opposite side of the split, a latch pivoted on the rigid handle, the latch having a wide notch formed intermediate its length and adapted to take over the resilient handle.

25. The combination with a split mold, of a pair of laterally projecting handles extending from opposite sides of the split and lying approximately parallel with each other to enable the mold and its contents to be carried, one of the handles being resilient, and a locking means for the mold associated with the handles.

26. A molding machine comprising a stationary hopper, a tamper, a stationary depending guide therefor, a table movable in a substantially horizontal plane beneath and away from the hopper, a core associated with the table, the core being independent of the guide, the upper end of the core lying adjacent to and in alinement with the lower end of the guide, and forming substantially a continuation thereof, and a mold carried by the table.

27. A molding machine comprising a stationary hopper having a neck depending therefrom, a table movable in a plane transverse to the longitudinal axis of the stationary hopper, a mold carried by the table, the upper end of the mold adapted to be brought into close juxtaposition to and in vertical alinement with the lower end of the neck, the diameters of the neck and of the mold being substantially equal, and tamping means suspended above the hopper and mold, the neck capable of having a plug formed therein by the tamping means and of stroking off the mold.

In testimony whereof, I affix my signature in presence of two witnesses.

HERMAN BESSER.

Witnesses:
J. H. BESSER,
HARRIET L. YAKE.